(12) United States Patent
Park et al.

(10) Patent No.: US 10,258,911 B2
(45) Date of Patent: Apr. 16, 2019

(54) PORTABLE WATER PURIFIER

(71) Applicants: IBT Co., Ltd., Buk-gu, Gwangju (KR); Jung Yong Kim, Gwangjin-gu, Seoul (KR); Handok Clean Tech Corporation, Yuseong-gu, Daejeon (KR); Ji Hyeon Lim, Seo-gu, Incheon (KR)

(72) Inventors: Sang Koo Park, Siheung-si (KR); Jung Yong Kim, Seoul (KR); Ji Hyeon Lim, Incheon (KR)

(73) Assignees: IBT Co., Ltd., Buk-gu, Gwangju (KR); Jung Yong Kim, Gwangjin-gu, Seoul (KR); Handok Clean Tech Corporation, Daejeon (KR); Ji Hyeon Lim, Seo-gu, Incheon (KR)

(*) Notice: Subject to any disclaimer, the term of this patent is extended or adjusted under 35 U.S.C. 154(b) by 127 days.

(21) Appl. No.: 15/461,022

(22) Filed: Mar. 16, 2017

(65) Prior Publication Data
US 2018/0200653 A1    Jul. 19, 2018

(30) Foreign Application Priority Data
Jan. 19, 2017  (KR) .................. 10-2017-0009147

(51) Int. Cl.
*B01D 35/26*    (2006.01)
*B01D 35/153*   (2006.01)
(Continued)

(52) U.S. Cl.
CPC .......... *B01D 35/26* (2013.01); *B01D 35/153* (2013.01); *B65D 47/066* (2013.01); *C02F 1/002* (2013.01);
(Continued)

(58) Field of Classification Search
CPC ...... C02F 1/002; C02F 1/003; C02F 2307/02; C02F 1/283; C02F 1/444; C02F 2201/005;
(Continued)

(56) References Cited

U.S. PATENT DOCUMENTS 5,680,966 A * 10/1997 Johnson ................ G01F 11/082
                                                    222/209
6,136,188 A * 10/2000 Rajan ................... B01D 35/027
                                                    210/244
(Continued)

FOREIGN PATENT DOCUMENTS

JP        2000301139 A    10/2000

*Primary Examiner* — Terry K Cecil
(74) *Attorney, Agent, or Firm* — Panitch Schwarze Belisario & Nadel LLP

(57) ABSTRACT

A portable water purifier according to the present invention includes: a container that is open at least at the top and has a predetermined internal volume; a cap that is coupled to the top of the container to seal the container and has an exit for selectively communicating with the container; a pump that is embedded in a side of the container and supplies air in a predetermined direction into the container; and a filter assembly that is coupled to the bottom of the cap and inserted in the container to filter water. According to the present invention, it is possible to simply supply purified water using pressure from the pump embedded in a side of the container to supply air into the container in a predetermined direction.

9 Claims, 15 Drawing Sheets

(51) Int. Cl.
    *C02F 1/00*          (2006.01)
    *B65D 47/06*       (2006.01)
    *C02F 1/28*          (2006.01)
    *C02F 1/44*          (2006.01)

(52) U.S. Cl.
    CPC .. *B01D 2201/167* (2013.01); *B01D 2201/202* (2013.01); *B01D 2201/304* (2013.01); *C02F 1/283* (2013.01); *C02F 1/444* (2013.01); *C02F 2201/005* (2013.01); *C02F 2307/02* (2013.01)

(58) Field of Classification Search
    CPC ............... B01D 35/26; B01D 35/153; B01D 2201/167; B01D 2201/202; B01D 2201/304; B65D 47/065–47/066
    See application file for complete search history.

(56) References Cited

U.S. PATENT DOCUMENTS 8,182,683 B1 * 5/2012 Allen ...................... C02F 1/003
                                                         210/244
2013/0214007 A1 * 8/2013 Simonian ........... B65D 51/1644
                                                         222/189.06

* cited by examiner

PORTABLE WATER PURIFIER

BACKGROUND OF THE INVENTION

Field of the Invention

The present invention relates to a portable water purifier that can be simply carried and can purify water without occupying a large space. More particularly, it relates to a portable water purifier that can simply supply purified water using pressure from a pump that is disposed in a side of a container and supplies air in a predetermined direction into the container.

Description of the Related Art

In general, a water purifier means a device that purifies water by filtering various impurities in water and technology for obtaining high-quality water has recently been attracting more interest because of global drinking water shortages due to population growth and environmental contamination. In particular, in third-world nations in areas such as Africa and Southeast Asia, many people have died due to severe drinking water shortages and they use contaminated water from nearby rivers or reservoirs for drinking water or daily life water without any purifying process. On the other hand, in advanced nations, a water purifier has been a necessary item not only in normal homes, but restaurants since there is increasing public interest in health.

Recently, as more people enjoy outdoor activities such as fishing or climbing, many people want to drink purified water outside. Further, it is also important to obtain high-quality drinking water in military field operations or exploration of wilderness areas, but there is a limitation in the amount of purified water a person can carry due to large volume or weight of the water. Further, since environmental contamination is getting worse, it is impossible in many cases to use natural flowing water or still water as drinking water.

Accordingly, portable water purifiers that can supply drinking water at any place by simply filtering water have been developed. In such devices, it is required to pass water through a filter in a water purifier in order to filter the water and a sufficient pressure difference is necessary for this process. However, it is difficult to obtain sufficient pressure for passing water through a filter in existing portable water purifiers, so it take long time to filter water.

A portable water purifier equipped with a pressurizing unit that has been developed to solve this problem has been disclosed in Japanese Patent Application Publication No. 2000-301139, but it has a defect of being too large in size because the pressurizing unit protrudes outside.

Documents of Related Art (Patent Document) Japanese Patent Application Publication No. 2000-301139 (published on 31 Oct. 2000)

SUMMARY OF THE INVENTION

Therefore, the present invention has been made in an effort to solve the problems in the related art and an object of the present invention is to provide a portable water purifier that can simply supply purified water using pressure from a pump that is disposed in a side of a container and supplies air in a predetermined direction into the container.

In order to achieve the objects of the present invention, a portable water purifier includes: a container having a predetermined internal volume; a cap coupled to a top of the container to seal the container and having an exit for selectively communicating with the container; a pump embedded in a side of the container and supplying external air in a predetermined direction into the container; and a filter assembly coupled to a bottom of the cap and inserted in the container to purify water kept in the container, in which the container has a seat recessed on the surface thereof to embed the pump and a hole formed in the seat to hermetically fix a portion of the pump in the container, and the pump is embedded in the seat of the container with a top exposed outside, is fixed to the container by being fitted in the hole, and keeps and then supplies external air into the container in a predetermine direction by being repeatedly deformed and restored by force repeatedly applied from the outside.

The container may further have a groove on a side opposite to the side where the seat is formed.

The portable water purifier may further include a cup detachably fitted on a bottom of the container.

The container may further have a groove continuously formed around a lower portion thereof and the cup has a plurality of projections protruding inward around a predetermined portion at a predetermined distance from the bottom of the container to be detachably fitted in the groove.

The cap may include: a cap body having a thread for coupling to the top of the container; a support member thread-fastened in the cap body; a drain member connecting a top and a bottom of the cap body, providing an exit for discharging purified water, and fitted in the support member; a fixing member fixing the drain member to the support member; and a cover coupled to the top of the cap body to open or close the cap body and closing or opening the exit of the drain member by pressing or releasing a top of the drain member.

The drain member may have a curved portion at a predetermined section of a lower portion to be bent and restored so that the curved portion is bent and stretched by force applied from above to open or close the exit.

The pump may include: a pump body made of an elastic and restorable rubber member and having a predetermined internal space and a check valve for taking external air inside; a pump cap having a first part sealing the pump body by being fitted in the pump body and a second part fixing the pump body by being fitted in the hole of the container and having a plurality of air vents; and a valve coupled to the pump cap and supplying air pressed by the pump body into the container in a predetermined direction through the air vents.

The check valve may be integrally formed with the pump body by cutting a portion of the pump body to be recessed from the outside and protrude inward.

The pump body may further have a guide groove for guiding external air so that the external air is smoothly supplied to the check valve.

The pump body may further have a reinforcing band elongated up and down and left and right from a center of the top in a cross shape and protruding inward.

According to the present invention, it is possible to simply supply purified water using pressure from the pump embedded in a side of the container to supply air into the container in a predetermined direction. That is, according to the present invention, since the pump is embedded in a side with only the top exposed outside, it is possible to not only easily carry the portable water purifier, but supply purified water only using pressure that is generated by repeatedly pressing the top of the pump.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, preferred embodiments of a portable water purifier according to the present invention are described in detail with reference to the accompanying drawings.

Figure 1:
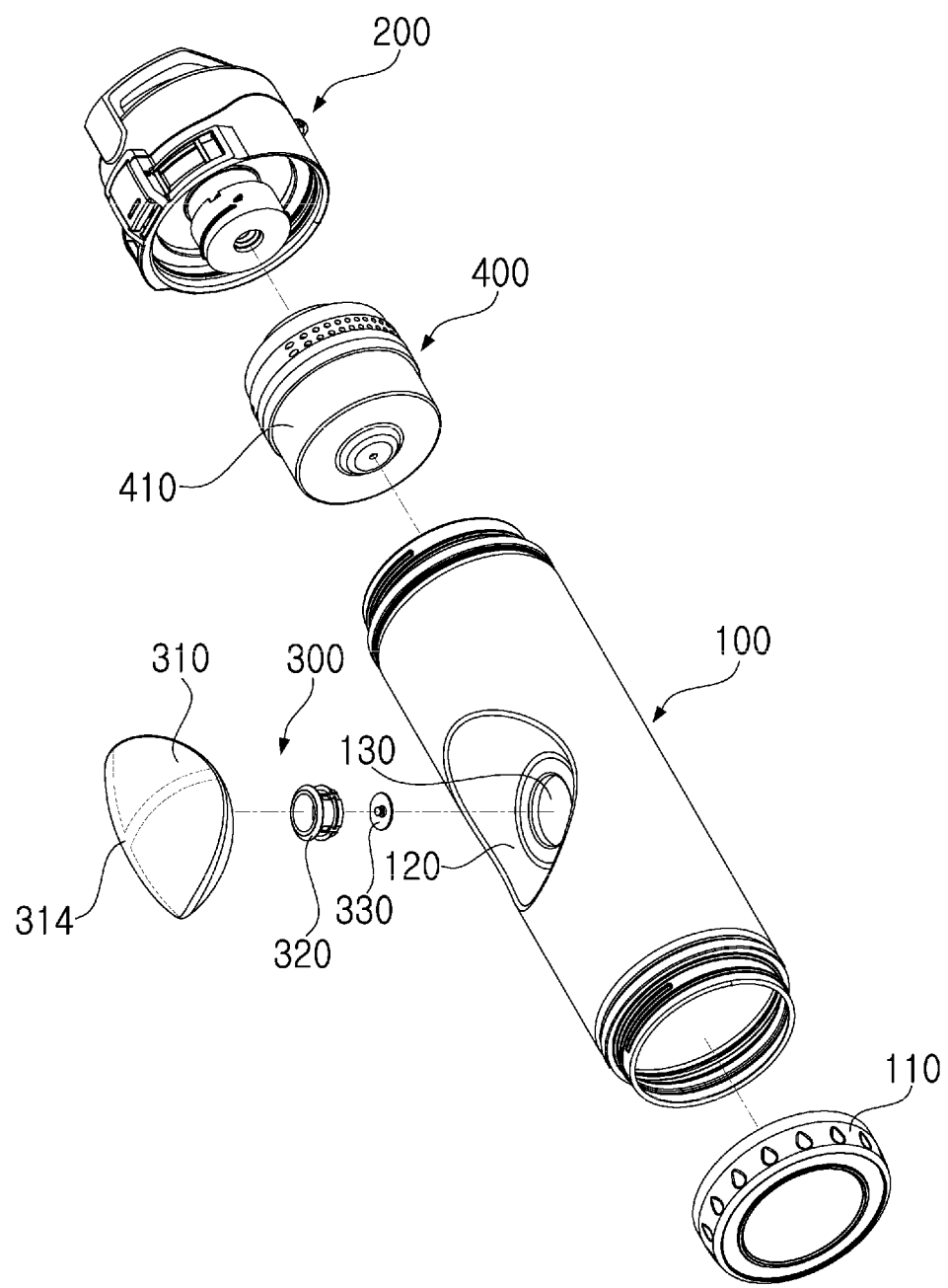
FIG. 1 is an exploded perspective view showing the relationship of components of a portable water purifier according to a first embodiment of the present invention.
Figure 2:
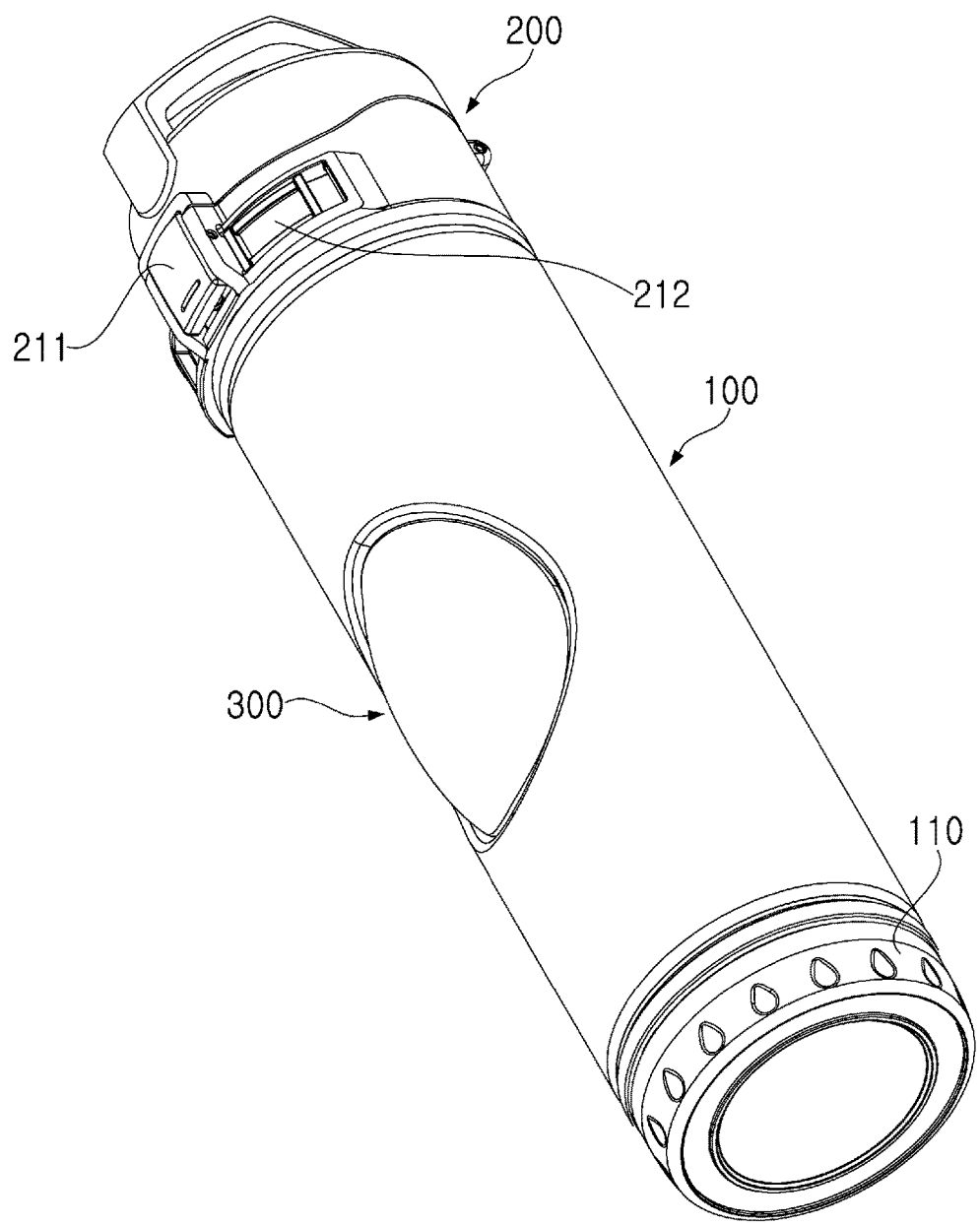
FIGS. 2 to 4 are a perspective view, a front view, and a side view of an assembly of the portable water purifier shown in FIG. 1.
Figure 3:
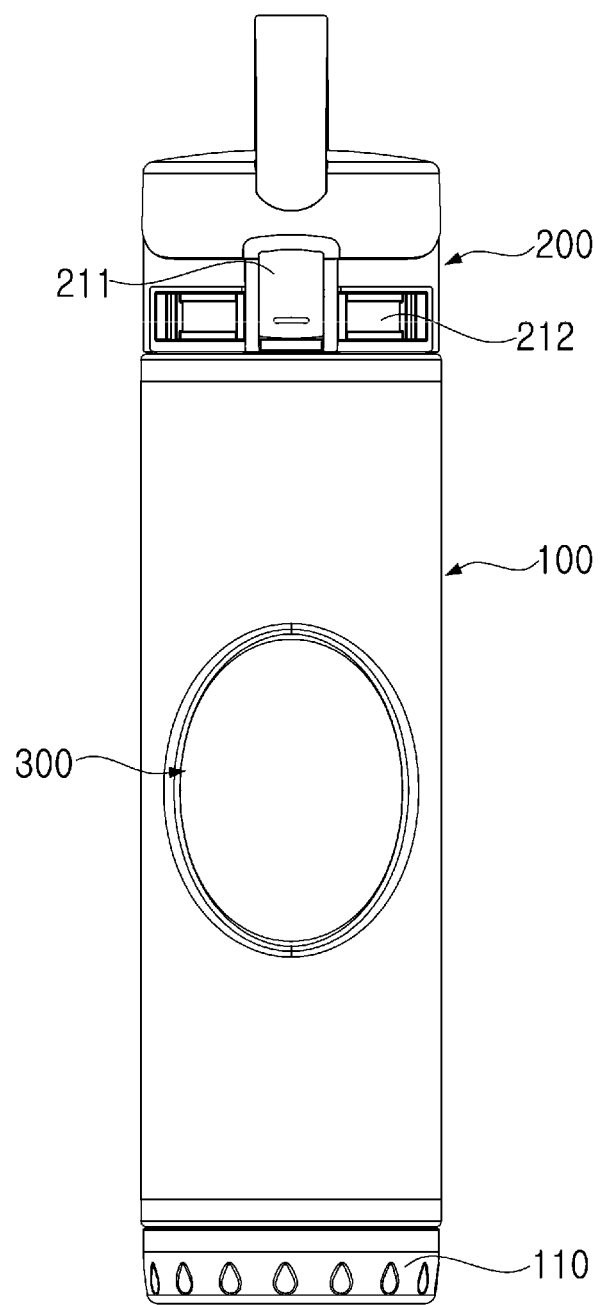
Figure 4:
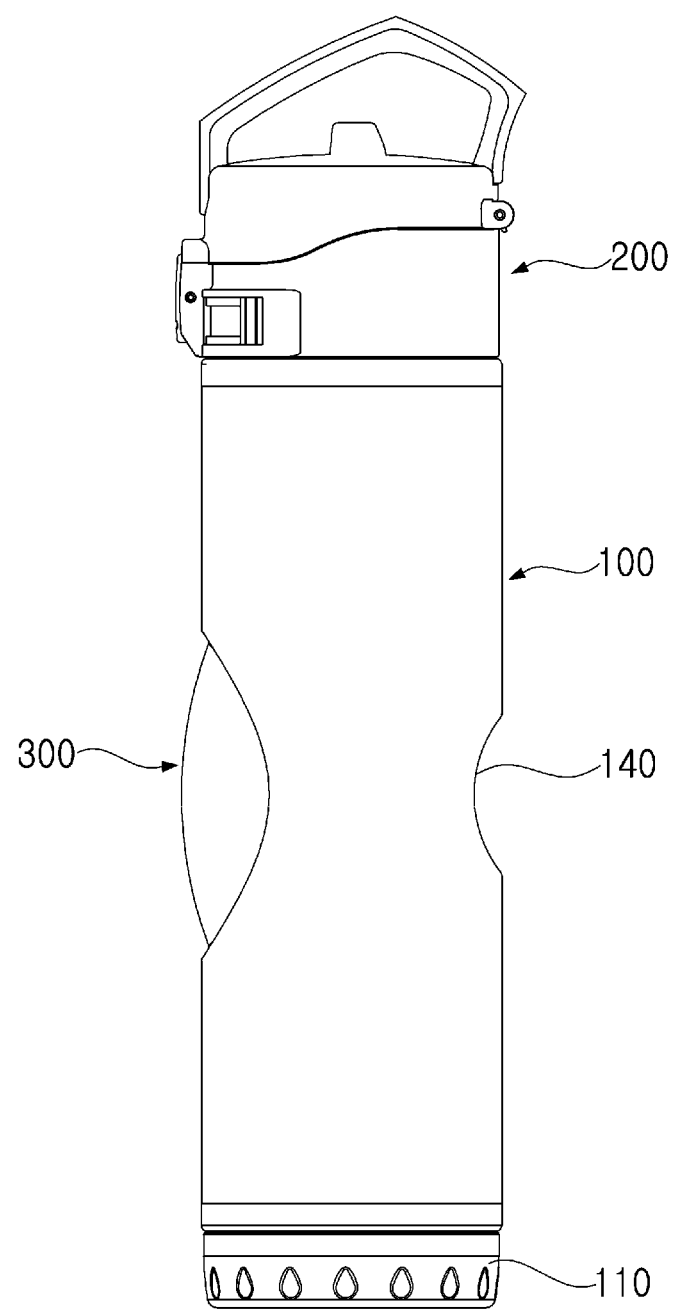

FIG. 1 is an exploded perspective view showing the relationship of components of a portable water purifier according to a first embodiment of the present invention and, FIGS. 2 to 4 are a perspective view, a front view, and a side view of an assembly of the portable water purifier shown in FIG. 1.

As shown in FIGS. 1 to 4, a portable water purifier according to an embodiment includes: a container 100 that is open at least at the top and has a predetermined internal volume; a cap 200 that is coupled to the top of the container 100 to seal the container 100 and has an exit for selectively communicating with the container 100; a pump 300 that is embedded in a side of the container 100 and supplies air in a predetermined direction into the container 100; and a filter assembly 400 that is coupled to the bottom of the cap 200 and inserted in the container 100 to purify water.

The container 100 has a size and an external appearance such that it can be conveniently carried and has an internal volume such that it can keep a predetermined amount of water therein. In this embodiment, the container 100 has a cylindrical shape to be conveniently carried and used and is made of a stainless material to be safe and easily manufactured. Further, the container is obtained by covering the bottom of a cylinder of which the top and bottom are open, with the cap 110. The container 100 according to this embodiment, however, may be made of various materials in various portable shapes. Further, a cylinder of which only the top is open may be used.

The container 100 has a seat 120 on a side to embed the pump 300 therein. The seat 120, which has a space and a shape such that the pump 300 can be embedded therein with only the surface exposed to the outside, is a hollow space on a side of the container 100. Accordingly, a convex portion corresponding to the seat 120 is formed inside the container 100. A hole 130 is formed at the center of the seat 120 so that a portion of the pump 300 is hermetically inserted in the container 100. The seat 120 may be formed by pressing a cylinder for making the container 100 and the hole 130 may be formed by cutting out the center of the seat 120.

The container 100 further has a groove 140 on the opposite side to the seat 120. The groove 140 provides a space for user's middle finger and ring finger so that the user can easily hold the container 100 in use. Accordingly, a user can conveniently drink purified water that is discharged out of the exit of the cap 200 by pressing the pump 300 with his/her thumb with his/her middle finger and ring finger in the groove 140. That is, a user can conveniently use the portable water purifier with only one hand.

Figure 5:
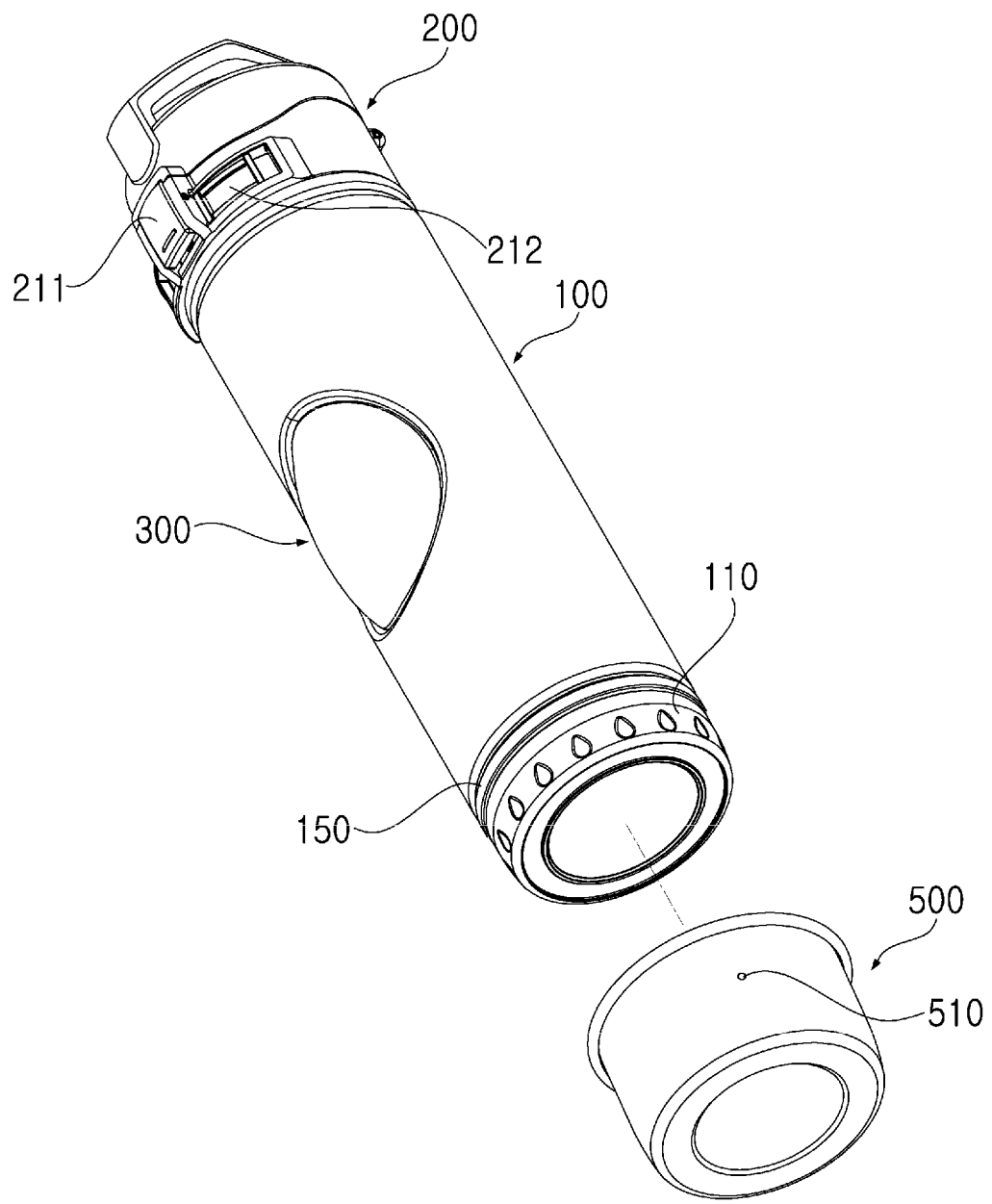
FIG. 5 is an exploded perspective view showing a coupling relationship for coupling a cup to the bottom of the portable water purifier shown in FIG. 2.
Figure 6:
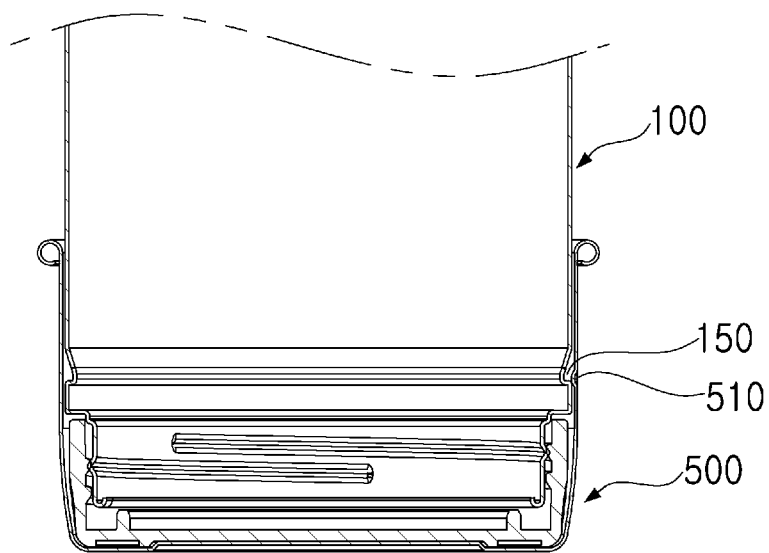
FIG. 6 is a partial cross-sectional view showing the coupling relationship between the cup and a container shown in FIG. 5.

FIG. 5 is an exploded perspective view showing a coupling relationship for coupling a cup to the bottom of the portable water purifier shown in FIG. 2 and FIG. 6 is a partial cross-sectional view showing the coupling relationship between the cup and a container shown in FIG. 5. As shown in FIGS. 5 and 6, the portable water purifier according to this embodiment may further have a cup 500 that is detachably fitted on the lower portion of the container 100. For this configuration, the container 100 has a groove 150 (bead) continuously formed around the lower portion and the cup 500 has a plurality of projections 510 protruding inward around a predetermined portion at a predetermined distance from the bottom of the container 100 to be detachably fitted in the groove 150. Accordingly, the cup 500 is fixed to and separated from the container 510 by fitting the projections 510 into the grooves 150 and pulling the projections 510 out of the groove 150.

Figure 7:
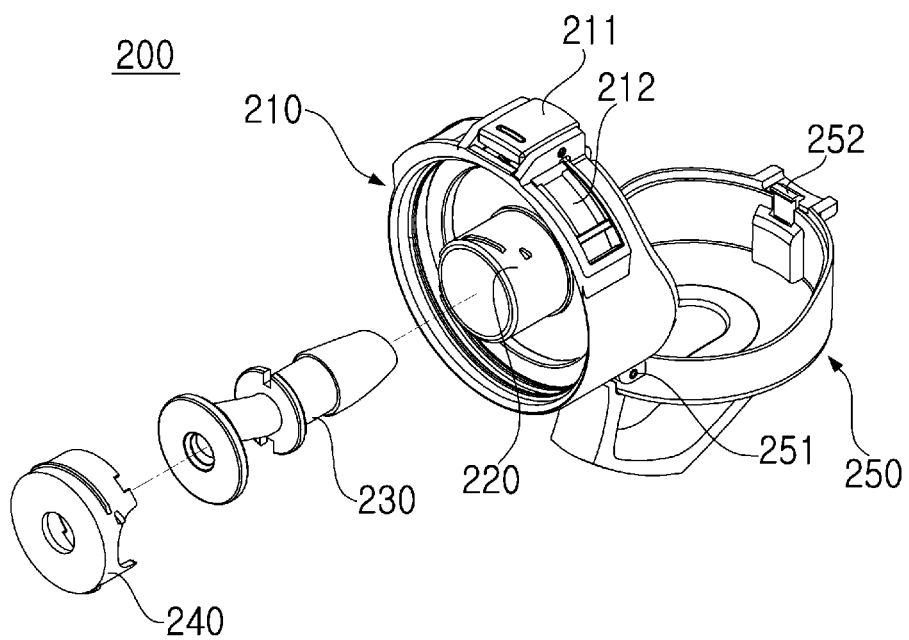
FIG. 7 is an exploded perspective view showing the configuration of a cap shown in FIG. 1.

FIG. 7 is an exploded perspective view showing the configuration of the cap shown in FIG. 1. As shown in FIGS. 1 to 7, the cap 200, which is a part that is coupled to the top of the container 100 to seal the container 100, has an exit for selectively communicating with the container 100. That is, the cap 200 includes a cap body 210 having a thread for coupling to the top of the container 100, a support member 220 thread-fastened in the cap body 210, a drain member 230 connecting the top and the bottom of the cap body 210, providing an exit for discharging purified water, and fitted in the support member 220, a fixing member 240 fixing the drain member 230 to the support member 220, and a cover 250 coupled to the top of the cap body 210 to open or close the cap body 210 and closing or opening the exit of the drain member 230 by pressing or releasing the top of the drain member 230.

The drain member 230 is a part through which purified water is discharged and on which a user puts his/her lips to drink water that is discharged after being purified. Accordingly, the drain member 230 may be made of a soft material. Further, the drain 230 is pushed down by force from the cover 250 when the cap body 210 is covered with the cover 250, and then when the cover 250 is opened and the force from the cover 250 is removed, the drain member 230 is moved back upward to the initial position. That is, the drain member 230 has a curved portion at a predetermined section of the lower portion to be bent and restored so that the curved portion is bent and stretched by the force applied from above to open or close the exit. Accordingly, when the cover 250 is closed, the exit of the drain member 230 is closed and the water in the container 100 cannot be discharged, but when the cover 250 is opened, the exit of the drain member 230 is opened and the water in the container 100 can be discharged.

Meanwhile, a stopper may be added to a hinge shaft 251 to prevent the cover 250 coupled to the top of the cap body 210 from freely moving after being opened. Further, a button 211 having a locking groove (not shown) for opening or closing the cover 250 is formed at the cap body 210 and a locking projection 252 that is locked into the locking groove is formed at the cover 250. Further, levers 212 that restrict pressing of the button 211 to prevent the cover 250 from opening are formed at the cap body 210. The levers 212 can slide left and right on the cap body 210 to selectively prevent the button 211 locking/unlocking the locking projection 252 in/out of the locking groove from being pressed.

Figure 8:
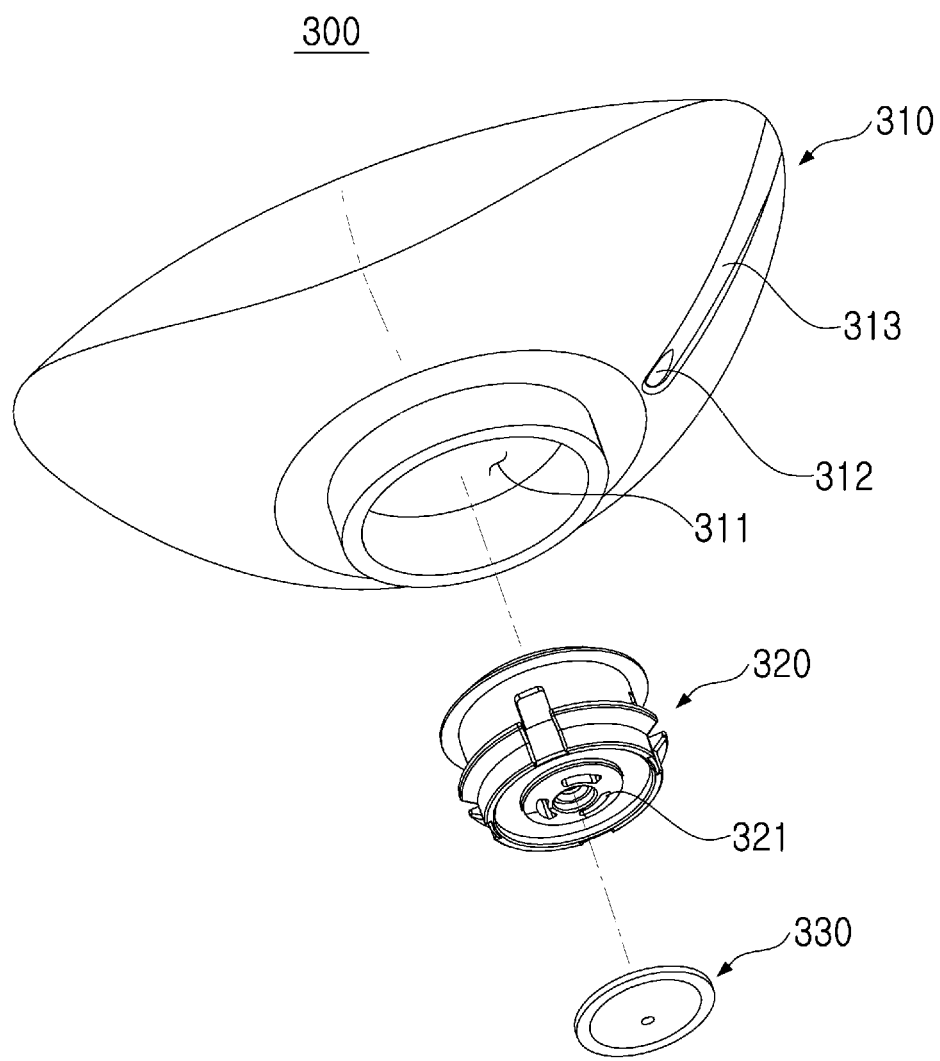
FIG. 8 is an exploded perspective view showing a pump shown in FIG. 1 at another angle.
Figure 9:
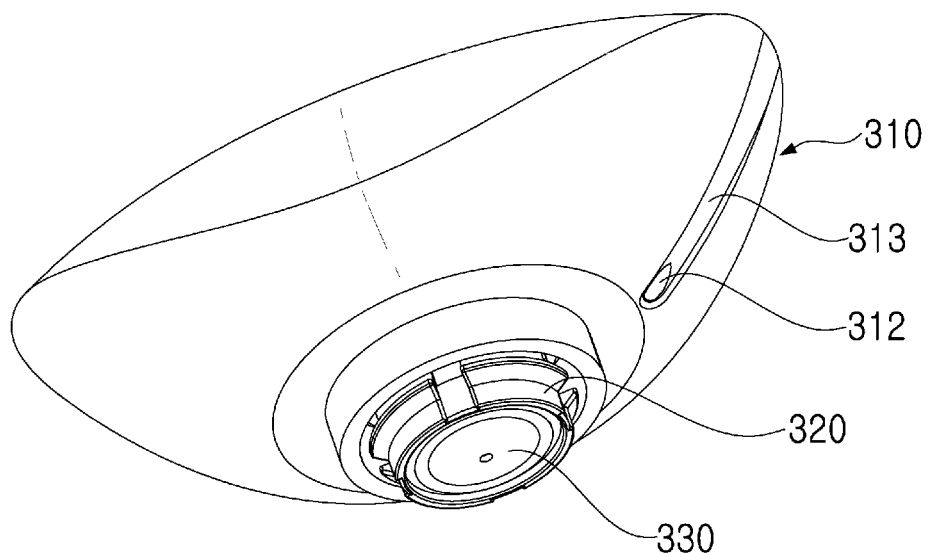
FIG. 9 is a perspective view when the pump shown in FIG. 8 is coupled to the container.
Figure 10:
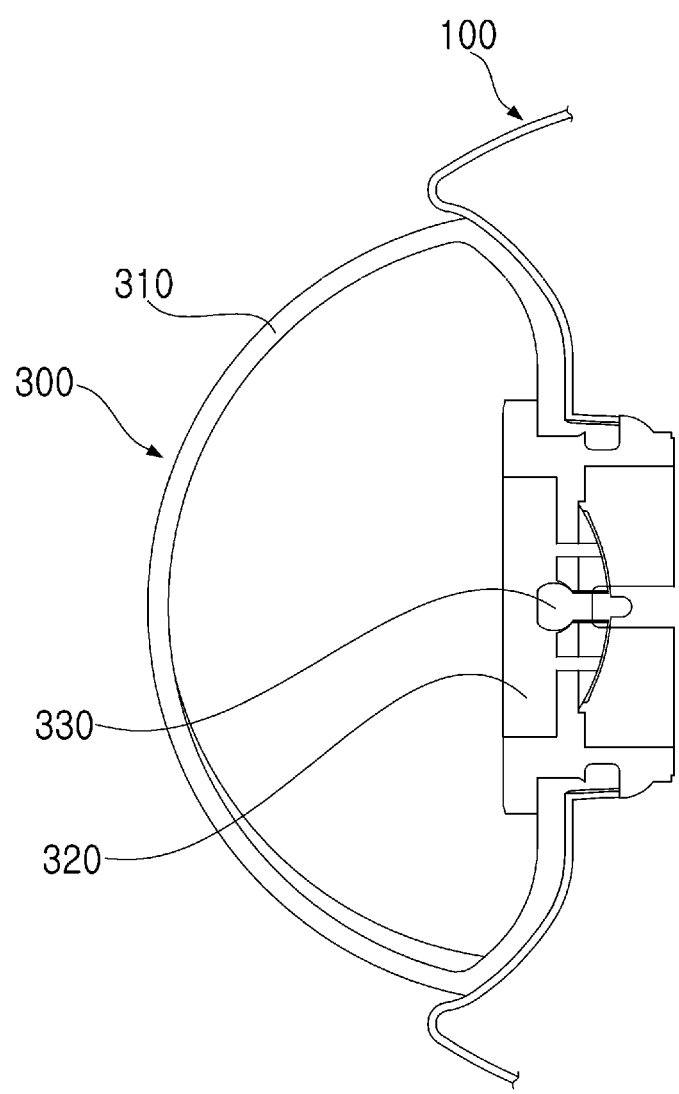
FIGS. 10 and 11 are vertical and horizontal partial cross-sectional views when the pump shown in FIG. 9 is embedded in a container.
Figure 11:
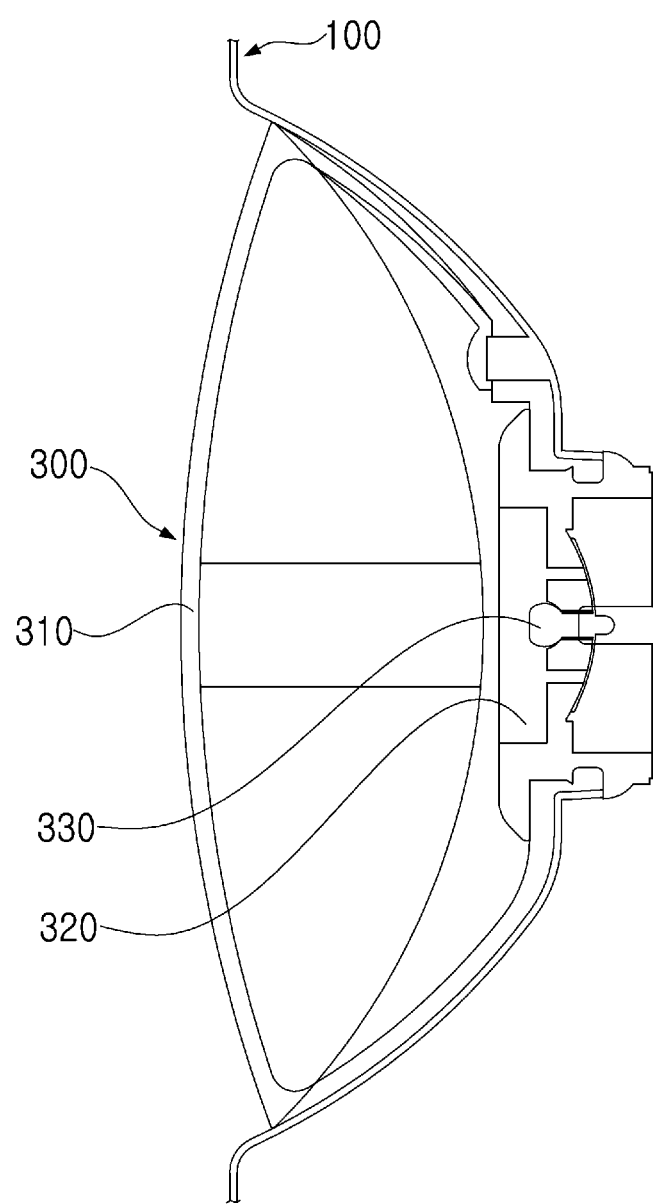

FIG. 8 is an exploded perspective view showing the pump shown in FIG. 1 at another angle, FIG. 9 is a perspective view when the pump shown in FIG. 8 is coupled to the container, and FIGS. 10 and 11 are vertical and horizontal partial cross-sectional views when the pump shown in FIG. 9 is embedded in a container. As shown in FIGS. 1 and 8 to 11, the pump 300 is embedded in the seat 120 formed on a side of the container 100 with only the top exposed to the outside and supplies air in a predetermined direction into the container 100. The pump 300 includes: a pump body 310 that is made of a soft rubber material for pressing air and has a predetermined internal space; a pump cap 320 of which a first part seals the pump body 310 by being fitted in the pump body 310 and a second part fixes the pump body 310 by being fitted in the hole 130 of the container 100 and has a plurality of air vents 321; and a valve 330 that is coupled to the pump cap 320, supplies air pressed by the pump body 310 into the container 100, and limits air flowing from the container 100 to the pump body 310. The valve 330 supplies air into the container 100 in only a predetermine direction.

The pump body 310 has an elliptical shape with a rounded surface, has an empty internal space, and has a hole 311 at the bottom in which the first part of the pump cap 320 is fitted. Further, the pump body 310 is made of a soft rubber member that can be elastically deformed and restored so that the pump body 310 can be deformed and restored when it is pressed. The pump body 310 has to transmit pressing force well when its top is pressed, and has to smoothly return to its initial state when released. To this end, as shown in FIG. 1, the pump body 310 of this embodiment further has a reinforcing band 314 that is elongated up and down and left and right from the center of the top in a cross shape and protrudes inward. The reinforcing band 314 is integrally formed thicker than other portions in the process of manufacturing the pump body 310. The reinforcing band 314 is elongated close to or over the edges of the inner side of the pump body 310. Since the reinforcing band 314 is thicker than other portions of the pump body 310, as described above, it allows for smooth transmission of pressing force and restoration to the initial state.

Further, when the pump body 310 has a check valve 312 for taking external air into the pump body 310 when the top of the pump body 310 is pressed and then released. The check valve 312, which is integrally formed in the process of manufacturing the pump body 310 by cutting a portion of the pump body to be recessed from the outside and protrude inward, keeps closed when the top of the pump body 310 is pressed so that the air in the pump body 310 flows into the container 100 through the valve 330.

The pump body 310 may further have a guide groove 313 that guides external air so that the external air can be smoothly supplied to the check valve 312. The guide groove 313 is formed straight from an edge of the pump body 310 to the check valve 312.

In this embodiment, the pump 300 is embedded in the seat 120 on the container 100. Accordingly, a gap is generated between the pump 300 and the seat 120 of the container 100. That is, when air is pumped by pressing the pump body 310, air flows into the check valve 312 through the gap, so air can be supplied into the pump body 310 through the check valve 312. Accordingly, it is not necessary to form the guide groove 313 on the pump body 310. However, when the guide groove 313 is formed, air can smoothly flow to the check valve 312.

As shown in FIG. 1, the filter assembly 400, which is coupled to the bottom of the cap 200 and disposed in the container 100 to purify water, includes a filter case 410 fitted on the fixing member 240 of the cap 200 and having a predetermined internal space and a filter (not shown) disposed in the filter case 410 to purify water.

The filter case 410 is fitted on the fixing member 240 at the top and has a plurality of inlets and one outlet so that water can be supplied to the filter therein and then discharged. The filter case 410 may be modified in various shapes that are generally used.

A most appropriate filter may be used for the filter, depending on the use, object, place, etc. That is, for the filter, appropriate kinds of filters for the use etc. may be selected from various commercial or authenticated filters that are in the market.

Figure 12:
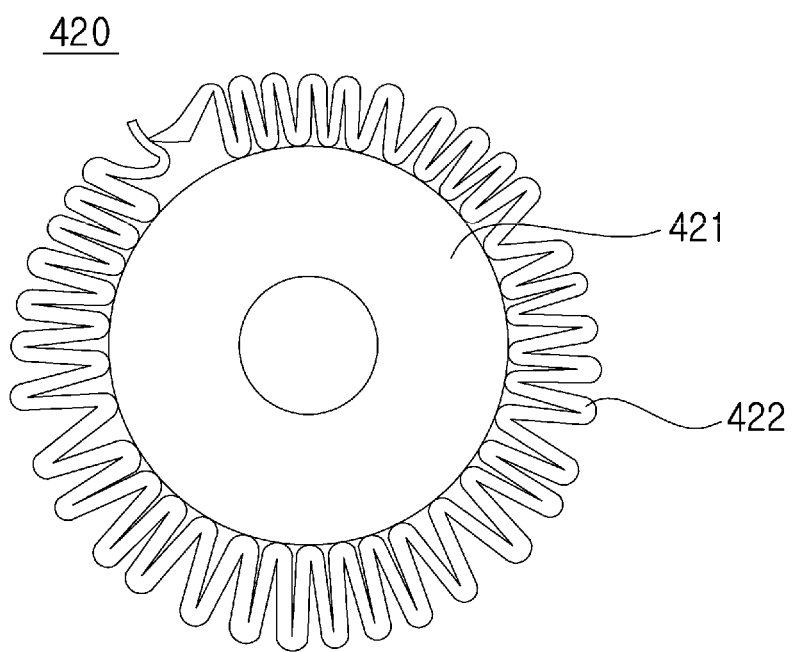
FIG. 12 is a plan view of a filter unit that is disposed in the filter assembly shown in FIG. 1.

FIG. 12 is a plan view of a filter unit that is disposed in the filter assembly shown in FIG. 1. As shown in FIG. 12, the filter unit 420 disposed in the filter assembly may be composed of a hollow carbon block filter 421 that removes remaining chlorine or heavy metals and has an antibiotic function and a membrane filter 422 that is disposed around the carbon block filter 421, has a function of removing viruses or bacteria, and has a pleated shape to be able to ensure maximum lifespan and efficiency.

Figure 13:
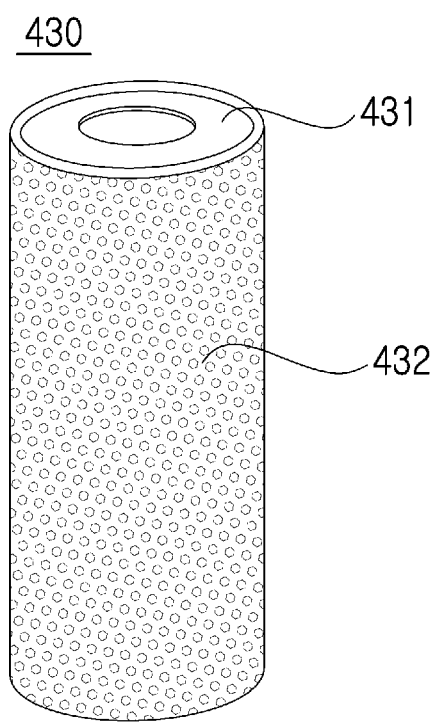
FIG. 13 is a perspective view of another filter unit that is disposed in the filter assembly shown in FIG. 1.

FIG. 13 is a perspective view of another filter unit that is disposed in the filter assembly shown in FIG. 1. As shown in FIG. 13, the filter unit 430 disposed in the filter assembly may be composed of a hollow carbon block filter 431 that removes remaining chlorine or heavy metals and has an antibiotic function, a hollow fiber membrane filter (not shown) that is inserted in the center of the hollow carbon block filter 431 and removes bacteria, and a non-woven fabric 432 that is disposed around the carbon block filter 431 and removes external remnants and granular substances.

The operation of the portable water purifier having the configuration of this embodiment is described hereafter.

As shown in FIGS. 1 to 13, first, a user separates the cap 200 from the container 100 and fills the container 100 with water to be purified. Next, the user seals the container 100 by coupling the cap 200 to the top of the container 100. The user opens the cover 250 by pressing the button 211 of the cover body 210. Accordingly, the curved portion of the drain member 230 that has been bent is stretched and the exit is opened, so the water in the container 100 can be discharged outside. In this state, the user inclines the container 100 with the drain member 230 between his/her lips. Accordingly, the filter is filled in the water to be purified, so the water can be filtered.

The user repeats pressing the pump body 310 in this state. Accordingly, external air flows to the check valve 312 through the guide groove 313 of the pump body 310, the air flows into the pump body 310 through the check valve 312 and keeps flowing into the container 100 through the valve 330, thereby pushing the water. Accordingly, the water to be purified in the container 100 is purified through the filter and then discharged into the user's mouth through the drain member 230. The user can drink the purified water by the pressure from the pump 300 even if he/she sucks the water with the drain member 230 between his/her lips.

The user erects the container 100 after drinking a desired amount of water. Accordingly, the air in the container flows upward and is discharged outside through the drain member 230 and the water to be purified moves down. Then, the user closes the cover 250. Accordingly, the curved portion of the drain member 230 is bent by the force from the cover 250, so the exit of the drain member 230 is closed and the water in the container 100 cannot be discharged outside.

On the other hand, even if the pump 300 is pressed by user by mistake or for fun and the inside of the container 100 is pressurized, the water is discharged little by little through the drain member 230, so the container 100 is never damaged. Further, since the user drinks the water purified through this process after the air remaining in the container 100 under a predetermined pressure is discharged outside through the drain member 230 when the cover 250 is opened, it does not matter that air remains under a predetermined pressure in the container 100.

As described above, the portable water purifier of this embodiment can simply provide purified water using the pressure from the pump 300 embedded in a side of the container 100 and supplying air into the container 100 in a predetermined direction. That is, since only the surface of the pump 300 embedded in the side of the container 100 is exposed outside in the portable water purifier of this embodiment, it is easy to carry the water purifier. Further, it is possible to simply drink purified water using the pressure that is generated by repeatedly pressing the top of the pump 300.

Figure 14:
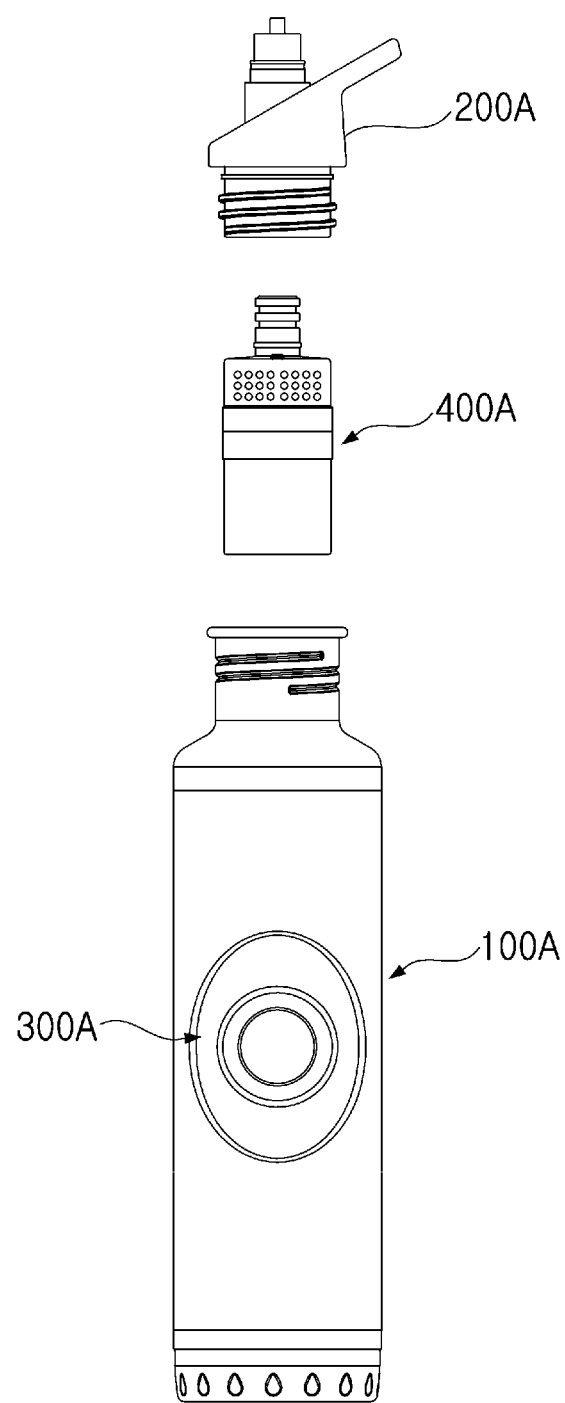
FIG. 14 is an exploded front view showing the relationship of components of a portable water purifier according to a second embodiment of the present invention.

FIG. 14 is an exploded front view showing the relationship of components of a portable water purifier according to a second embodiment of the present invention. As shown in FIG. 14, according to the portable water purifier of this embodiment, the shape of a container 100A is partially changed and the relationship with a cap 200A is accordingly changed, but other detailed configurations and operations are the same except a change in shape of a filter assembly 400A. That is, a user can conveniently drinks purified water using pressure from a pump 300A in the same way as in the first embodiment. Therefore, the detailed configuration and operation are not described here.

On the other hand, the cap 200A is, similar to common beverage containers, configured such that an exit that communicates with the container 100A is opened by pulling a drain member outside to erect it and the exit is disconnected from the container 100A by pushing back inside the drain member. The structure of the cap 200A is the same as in beverage containers that are in the market now, so it is not described in detail.

Figure 15:
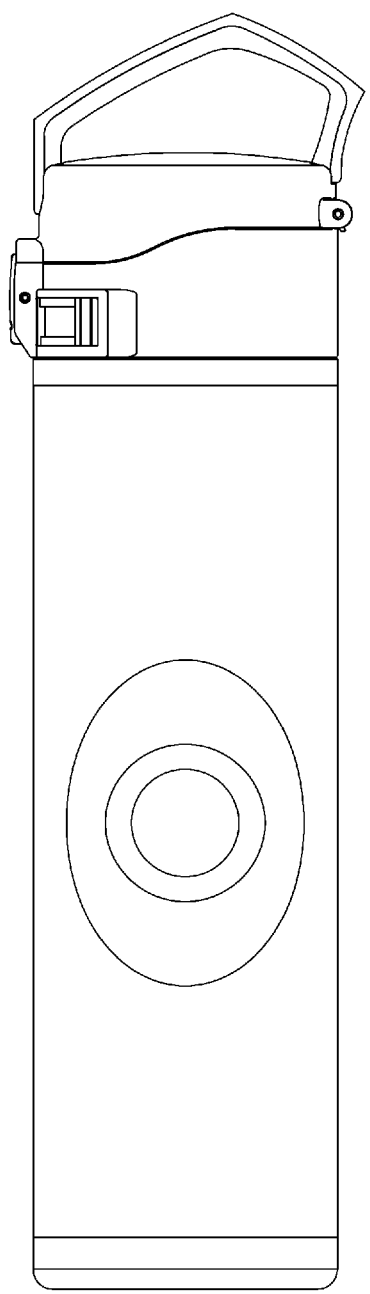
FIGS. 15 and 16 are front views showing the relationship of components of portable water purifiers according to third and fourth embodiments of the present invention.
Figure 16:
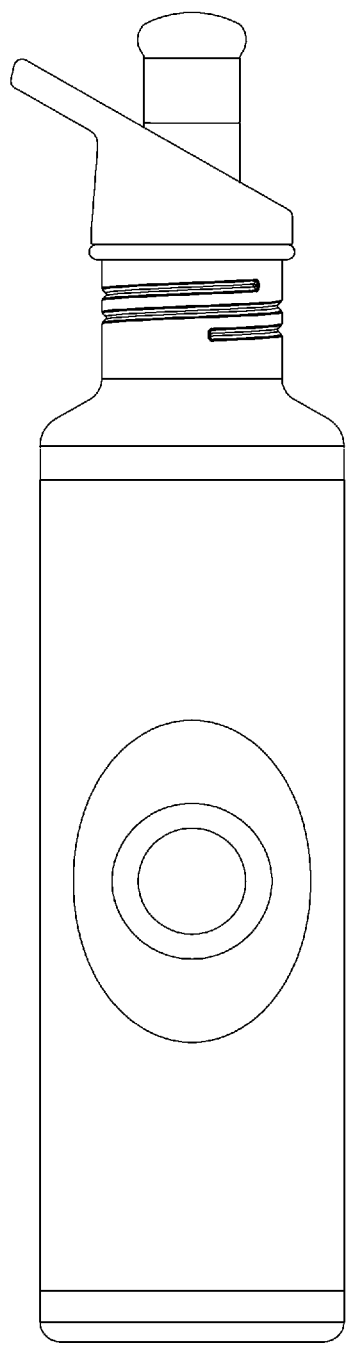

FIGS. 15 and 16 are front views showing the relationship of components of portable water purifiers according to third and fourth embodiments of the present invention. The portable water purifiers shown in FIGS. 15 and 16 are same as those of the first and second embodiments except that the bottoms of the containers are not opened or closed by a cap, but originally closed. The bottoms of the containers are closed in the process of manufacturing the containers or are closed by welding a separate cap after manufacturing a cylinder with an open bottom.

Portable water purifiers of the present invention have been described above with reference to the accompanying drawings, but they are just preferable examples. Therefore, it is apparent to those skilled in the art that the present invention is not limited to the embodiments and may be modified in various ways without departing from the spirit and scope of the present invention, so it should be understood that those modifications and changes are included in claims of the present invention.

What is claimed is:

1. A portable water purifier comprising: a container having a predetermined internal volume; a cap coupled to a top of the container to seal the container and having an exit for selectively communicating with the container; a pump embedded in a side of the container and supplying external air in a predetermined direction into the container; and a filter assembly coupled to a bottom of the cap and inserted in the container to purify water kept in the container,
    wherein the container has a seat recessed on the surface thereof to embed the pump and a hole formed in the seat to hermetically fix a portion of the pump in the container, and
    wherein the cap includes: a cap body having a thread for coupling to the top of the container: a support member thread-fastened in the cap body; a drain member connecting a top and a bottom of the cap body, providing an exit for discharging purified water, and fitted in the support member; a fixing member fixing the drain member to the support member; and a cover coupled to the top of the cap body to open or close the cap body and closing or opening the exit of the drain member by pressing or releasing a top of the drain member.

2. The portable water purifier of claim 1, wherein the container further has a groove on a side opposite to the side where the seat is formed.

3. The portable water purifier of claim 1, further comprising a cup detachably fitted on a bottom of the container.

4. The portable water purifier of claim 3, wherein the container further has a groove continuously formed around a lower portion thereof and the cup has a plurality of projections protruding inward around a predetermined portion at a predetermined distance from the bottom of the container to be detachably fitted in the groove.

5. The portable water purifier of claim 1, wherein the drain member has a curved portion at a predetermined section of a lower portion to be bent and restored so that the curved portion is bent and stretched by force applied from above to open or close the exit.

6. The portable water purifier of claim 1, wherein the pump includes: a pump body made of an elastic and restorable rubber member and having a predetermined internal space and a check valve for taking external air inside; a pump cap having a first part sealing the pump body by being fitted in the pump body and a second part fixing the pump body by, being fitted in the hole of the container and having a plurality of air vents; and a valve coupled to the pump cap and supplying air pressed by the pump body into the container in a predetermined direction through the air vents.

7. The portable water purifier of claim 6, wherein the check valve is integrally formed with the pump body by cutting a portion of the pump body to be recessed from the outside and protrude inward.

8. The portable water purifier of claim 6, wherein the pump body further has a guide groove for guiding external air so that the external air is smoothly supplied to the check valve.

9. The portable water purifier of claim 6, wherein the pump body further has a reinforcing band elongated up and down and left and right from a center of the top in a cross shape and protruding inward.

* * * * *